US010989479B2

(12) United States Patent
Dziubinschi et al.

(10) Patent No.: US 10,989,479 B2
(45) Date of Patent: Apr. 27, 2021

(54) INTEGRATED LIQUID AIR COOLED CONDENSER AND LOW TEMPERATURE RADIATOR

(71) Applicant: Hanon Systems, Daejeon (KR)

(72) Inventors: Orest Alexandru Dziubinschi, Dearborn, MI (US); Brennan Sicks, Farmington Hills, MI (US); Kyle Hanson, Northville, MI (US); Dave Letteer, Brighton, MI (US)

(73) Assignee: HANON SYSTEMS, Daejeon (KR)

( * ) Notice: Subject to any disclaimer, the term of this patent is extended or adjusted under 35 U.S.C. 154(b) by 240 days.

(21) Appl. No.: 16/149,406

(22) Filed: Oct. 2, 2018

(65) Prior Publication Data

US 2020/0033064 A1   Jan. 30, 2020

Related U.S. Application Data

(60) Provisional application No. 62/702,662, filed on Jul. 24, 2018.

(51) Int. Cl.
*F28D 7/00* (2006.01)
*B60H 1/32* (2006.01)
*B60H 1/00* (2006.01)

(52) U.S. Cl.
CPC ........ *F28D 7/0083* (2013.01); *B60H 1/00321* (2013.01); *B60H 1/3227* (2013.01); *B60H 2001/3289* (2013.01)

(58) Field of Classification Search
CPC ............... F28D 7/0083; F28D 1/05316; B60H 1/00321; B60H 1/3227; B60H 2001/3289
See application file for complete search history.

(56) References Cited

U.S. PATENT DOCUMENTS

| | | | |
|---|---|---|---|
| 4,620,588 A * | 11/1986 | Pfouts | F02C 7/14 165/285 |
| 8,225,852 B2 * | 7/2012 | Wu | F02B 29/0462 165/140 |
| 9,562,727 B2 * | 2/2017 | Fujii | F28D 1/05375 |
| 9,631,871 B2 * | 4/2017 | Contet | F28F 9/0224 |
| 2002/0040776 A1 * | 4/2002 | Kokubunji | F28F 9/0226 165/140 |
| 2003/0217567 A1 * | 11/2003 | Oh | F25B 39/04 62/507 |

(Continued)

FOREIGN PATENT DOCUMENTS

FR    2994256 A1    2/2014
JP    2008180485 A    8/2008

*Primary Examiner* — Jon T. Schermerhorn, Jr.
(74) *Attorney, Agent, or Firm* — Shumaker, Loop & Kendrick, LLP; James D. Miller

(57) ABSTRACT

An integrated heat exchanger assembly comprises a first header tank, a second header tank, a first heat exchanger core extending between the first header tank and the second header tank, a second heat exchanger core extending between the first header tank and the second header tank, and a third heat exchanger core extending between the first header tank and the second header tank. The first heat exchanger core is in fluid communication with a liquid coolant and a refrigerant, the second heat exchanger core in fluid communication with a first portion of a flow of air and the refrigerant, and the third heat exchanger core in fluid communication with a second portion of the flow of the air and the liquid coolant.

20 Claims, 9 Drawing Sheets

(56) References Cited

U.S. PATENT DOCUMENTS

2006/0113068 A1\* 6/2006 Desai ................ F28D 1/0435
165/140
2013/0213624 A1\* 8/2013 Fujii ................ F28D 1/05375
165/173

\* cited by examiner

INTEGRATED LIQUID AIR COOLED CONDENSER AND LOW TEMPERATURE RADIATOR

CROSS-REFERENCE TO RELATED APPLICATION

This patent application claims priority to U.S. Provisional Patent Application Ser. No. 62/702,662 filed on Jul. 24, 2018, the entire disclosure of which is hereby incorporated herein by reference.

FIELD OF THE INVENTION

The invention relates to an integrated heat exchanger assembly utilizing air, refrigerant, and a liquid coolant as heat exchanging fluids.

BACKGROUND OF THE INVENTION

It has become increasingly common for multiple heat exchangers associated with operation of a motor vehicle to be integrated into a single assembly in order to reduce a packaging size of the heat exchangers within the motor vehicle. The heat exchangers forming the integrated heat exchanger assembly may be associated with a variety of different heat exchanging fluids such as the ambient air, a refrigerant circulating through a heating, ventilating, and air conditioning (HVAC) system of the motor vehicle, and a coolant associated with regulating the temperature of various components of the motor vehicle such as the electrical components thereof.

In order to further reduce the packaging size of the heat exchanger assembly, many integrated heat exchanger assemblies include the stacking of multiple air-passed heat exchanger cores in a flow path of the ambient air through the cooling module. Unfortunately, such stacking in the air flow direction detrimentally leads to all air passing through the downstream arranged heat exchanger core having a lowered heat exchange capacity by virtue of the air having already exchanged heat energy with the upstream heat exchanger core, thereby tying the effectiveness of the downstream heat exchanger core to the instantaneous heat exchange capacity of the upstream heat exchanger core.

However, avoiding the aforementioned stacked configuration of the heat exchanger cores forming the integrated assembly negatively leads to an increasing of the air flow area that must be occupied by the non-stacked heat exchanger cores. This increased air flow area results in the packaging size of the integrated heat exchanger assembly being increased along a plane arranged perpendicular to the direction of flow of the air through the integrated heat exchanger assembly, thereby reducing the available configurations suitable for receiving the integrated heat exchanger assembly when installed relative to the remaining components of the motor vehicle.

Accordingly, it would be desirable to create an integrated heat exchanger assembly that maintains a desired heat exchange capacity while reducing a packaging size thereof.

SUMMARY OF THE INVENTION

Compatible and attuned with the present invention, an integrated heat exchanger assembly having a reduced packaging space has been surprisingly discovered.

In one embodiment of the invention, an integrated heat exchanger assembly comprises a first header tank, a second header tank, a first heat exchanger core extending between the first header tank and the second header tank, a second heat exchanger core extending between the first header tank and the second header tank, and a third heat exchanger core extending between the first header tank and the second header tank. The first heat exchanger core is in fluid communication with a liquid coolant and a refrigerant, the second heat exchanger core in fluid communication with a first portion of a flow of air and the refrigerant, and the third heat exchanger core in fluid communication with a second portion of the flow of the air and the liquid coolant.

According to another embodiment of the invention, an integrated heat exchanger assembly comprises a first header tank, a second header tank, a first heat exchanger core including a plurality of first tubes extending between the first header tank and the second header tank with each of the first tubes in fluid communication with a liquid coolant and a refrigerant, a second heat exchanger core including a plurality of second tubes extending between the first header tank and the second header tank with each of the second tubes in fluid communication with a flow of air and one of the liquid coolant or the refrigerant, and a housing extending between the first header tank and the second header tank. The housing surrounds the first tubes and delimiting a flow of the liquid coolant in fluid communication with each of the first tubes.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
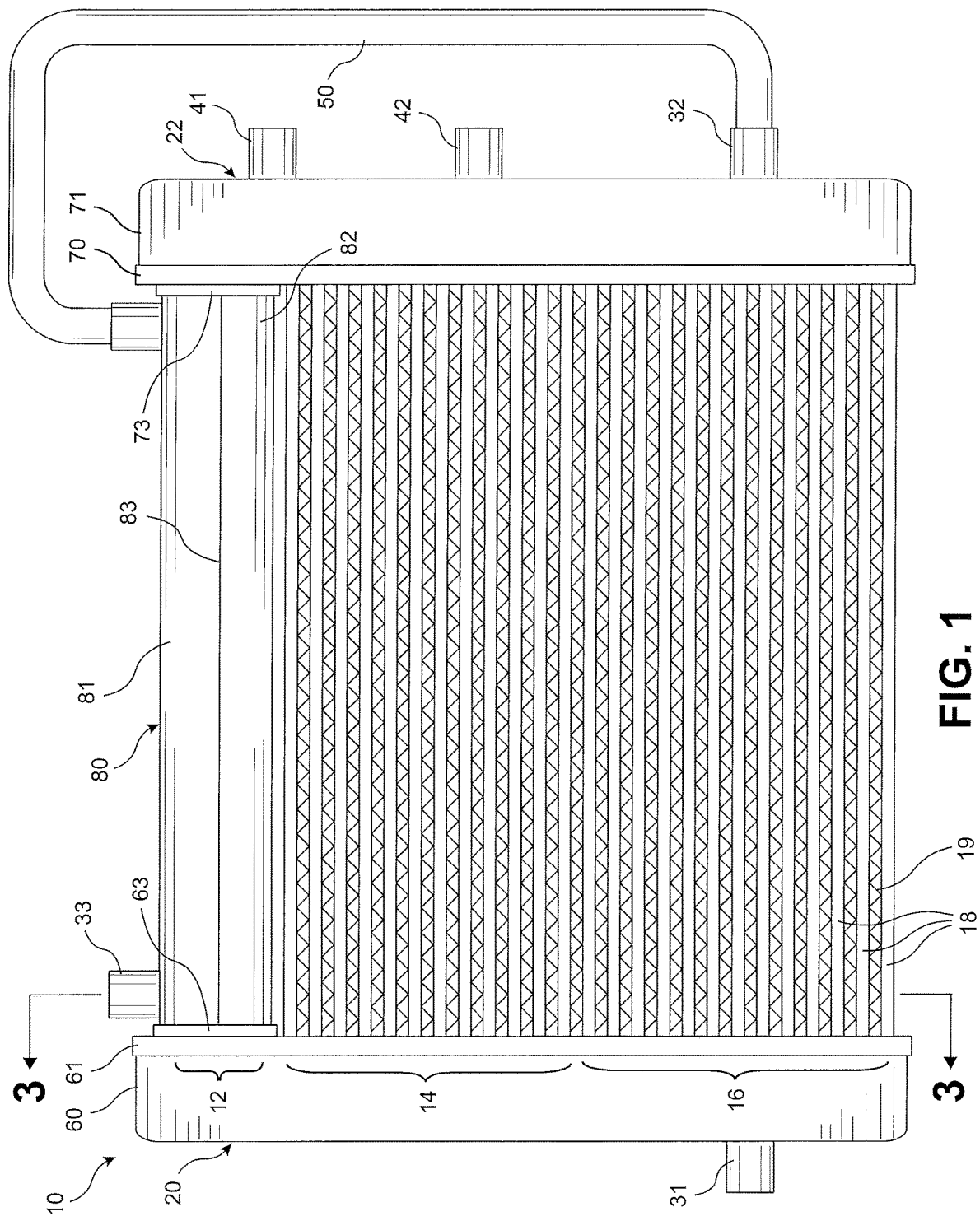
FIG. 1 is an elevational view of an integrated heat exchanger assembly according to an embodiment of the present invention.
Figure 2:
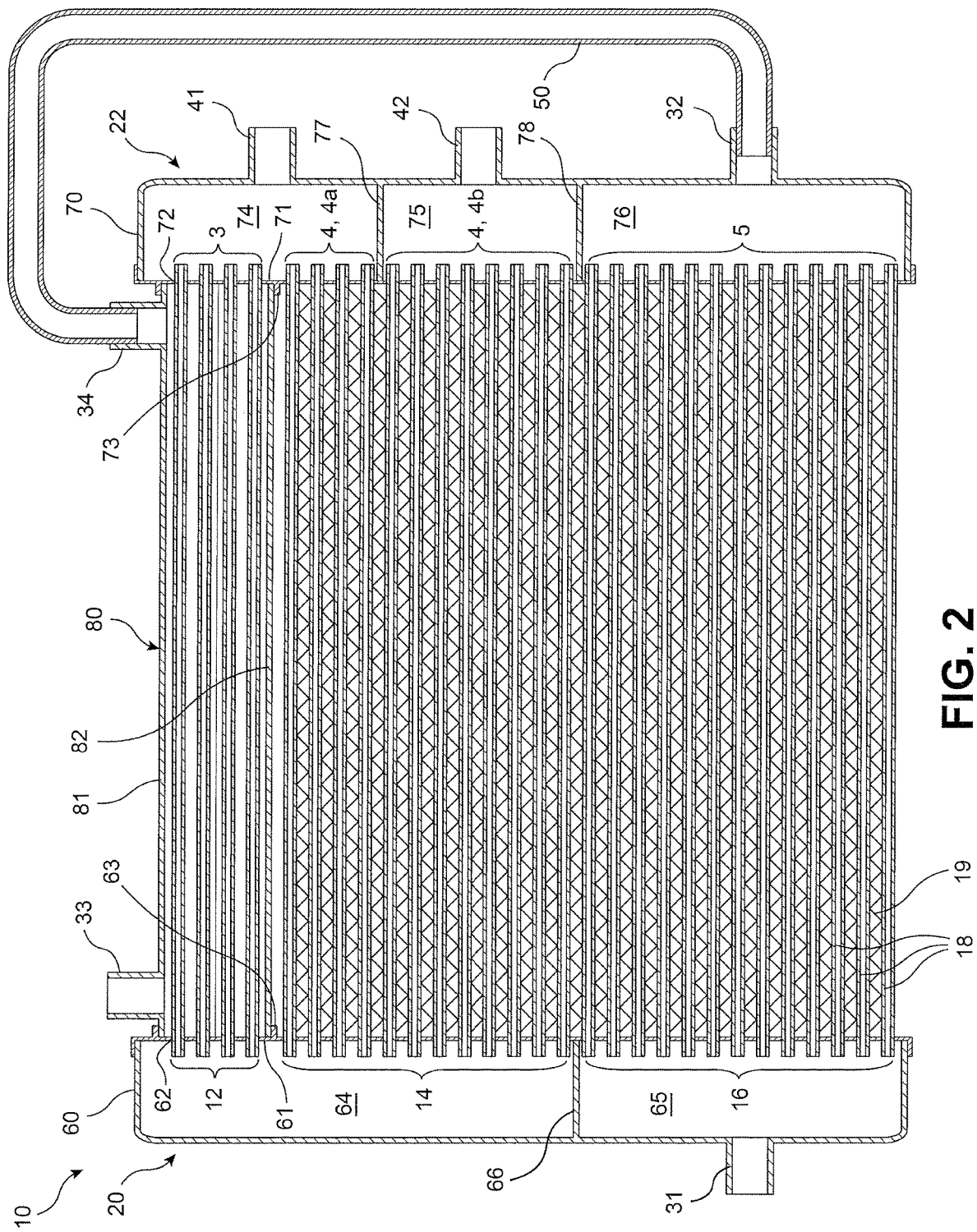
FIG. 2 is a cross-sectional elevational view of the integrated heat exchanger assembly of FIG. 1.

FIGS. 1 and 2 illustrate an integrated heat exchanger assembly 10 according to an embodiment of the present invention. The heat exchanger assembly 10 includes a plurality of heat exchanger cores integrated into a single heat exchanging structure, wherein each heat exchanger core refers to a portion of the heat exchanger assembly 10 having structure for exchanging heat energy between two different heat exchanging fluids. The heat exchanger assembly 10 is shown in FIGS. 1 and 2 as including a liquid cooled condenser core 12, an air cooled condenser core 14, and a low temperature radiator core 16.

The liquid cooled condenser core 12 is configured for exchanging heat energy between a flow of a liquid coolant associated with cooling heat generating components of the motor vehicle and a flow of a refrigerant used in an HVAC system of the motor vehicle. The liquid coolant may be water, glycol, or combinations thereof, as non-limiting examples. However, any form of suitable liquid coolant may be used without necessarily departing from the scope of the present invention, so long as the liquid coolant has the desired heat exchange characteristics. The air cooled condenser core 14 is configured for exchanging heat energy between a first portion of a flow of ambient air and the refrigerant of the HVAC system. The low temperature radiator core 16 is configured for exchanging heat energy between a second portion of the flow of the ambient air and the liquid coolant associated with the liquid cooled condenser core 12. However, one skilled in the art should appreciate that the heat exchanger assembly 10 may include any combination of heat exchanger cores utilizing different heat exchanging fluids from those disclosed herein without necessarily departing from the scope of the present invention. The liquid cooled condenser core 12, the air cooled condenser core 14, and the low temperature radiator core 16 may alternatively be referred to hereinafter as the first heat exchanger core 12, the second heat exchanger core 14, and the third heat exchanger core 16, respectively, or the heat exchanger cores 12, 14, 16, collectively.

The heat exchanger cores 12, 14, 16 are each formed by a plurality of heat exchanger tubes 18 extending between a first header tank 20 and a second header tank 22. The heat exchanger cores 12, 14, 16 may include the plurality of the parallel arranged heat exchanger tubes 18 spaced apart from each other for allowing the flow of a corresponding heat exchanging fluid to pass therebetween. The heat exchanger tubes 18 may have any suitable cross-sectional shape and configuration for the given application. The heat exchanger tubes 18 may be extruded to include one or more voids forming fluid flow paths through each of the heat exchanger tubes 18. Alternatively, the heat exchanger tubes 18 may be formed by bending or folding a sheet of material into a prescribed shape including one or more openings formed between adjacent portions of the sheet for forming fluid flow paths therein. The heat exchanger tubes 18 may include a substantially B-shaped cross-section including a central reinforcing structure separating a pair of fluid flow paths from each other, as one non-limiting example.

The heat exchanger tubes 18 may be formed from a metallic material such as aluminum or an alloy thereof. The heat exchanger tubes 18 may be at least partially coated with a suitable brazing material for initiating a brazing process for coupling the heat exchanger tubes 18 to the first and second header tanks 20, 22.

The heat exchanger tubes 18 are divided into a plurality of first tubes 3, a plurality of second tubes 4, and a plurality of third tubes 5. The first tubes 3 are associated with the liquid cooled condenser core 12 with each of the first tubes 3 configured to convey the refrigerant through an interior thereof while the liquid coolant passes over an exterior surface thereof. The second tubes 4 are associated with the air cooled condenser core 14 with each of the second tubes 4 configured to convey the refrigerant through an interior thereof while the air passes over an exterior surface thereof. The second tubes 4 may be further divided into a first set 4a of the second tubes 4 and a second set 4b of the second tubes 4, wherein the first set 4a of the second tubes 4 includes the refrigerant flowing therethrough in a first direction while the second set 4b of the second tubes 4 includes the refrigerant flowing therethrough in an opposing second direction. The third tubes 5 are associated with the low temperature radiator core 16 with each of the third tubes 5 configured to convey the liquid coolant through an interior thereof while the air passes over an exterior surface thereof.

As shown in FIGS. 1 and 2, the liquid cooled condenser core 12, the air cooled condenser core 14, and the low temperature radiator core 16 extend longitudinally between the first header tank 20 and the second header tank 22. The header tanks 20, 22 act as manifolds for distributing or recombining the heat exchanging fluids associated with operation of the heat exchanger assembly 10.

The first header tank 20 may include a first casing 60 and a first header 61. The first header 61 includes a plurality of spaced apart first tube openings 62 with each of the first tube openings 62 configured to receive an end portion of one of the heat exchanger tubes 18 therein. The first casing 60 defines a hollow interior of the first header tank 20. The first header 61 may be coupled to the first casing 60 about a perimeter of an opening formed in the first casing 60 by any known method, including crimping, brazing, welding, or the use of fasteners, as desired. The first header 61 may extend along a length of the first header tank 20 in a manner wherein each of the heat exchanger cores 12, 14, 16 engages a portion of the first header 61. A suitable seal (not shown) may be compressed between the first header 61 and the first casing 60 for preventing leakage from the first header tank 20 depending on the form of the coupling between the first header 61 and the first casing 60. The first header 61 may include a peripheral rim or a plurality of circumferentially spaced tabbed portions suitable for being crimped to the first casing 60, as desired.

The first header 61 may be formed from a metallic material such as aluminum or an alloy thereof. The first header 61 may be at least partially coated with a suitable brazing material for initiating a brazing process. The first casing 60 may be formed from any suitable rigid material, such as the metallic material selected for the first header 61 and each of the heat exchanger tubes 18, or the rigid material may be a rigid plastic material, as desired.

The first header 61 is shown and described as a separately formed structure coupled to the first casing 60, but the first header tank 20 may have any suitable structure so long as a surface of the first header tank 20 having the first tube openings 62 faces towards the second header tank 22. As such, the first header 61 as used herein refers to a portion of the first header tank 20 facing towards the second header tank 22 and including the first tube openings 62 regardless of whether or not the first header 61 is formed separately from the remainder of the first casing 60.

Figure 3:
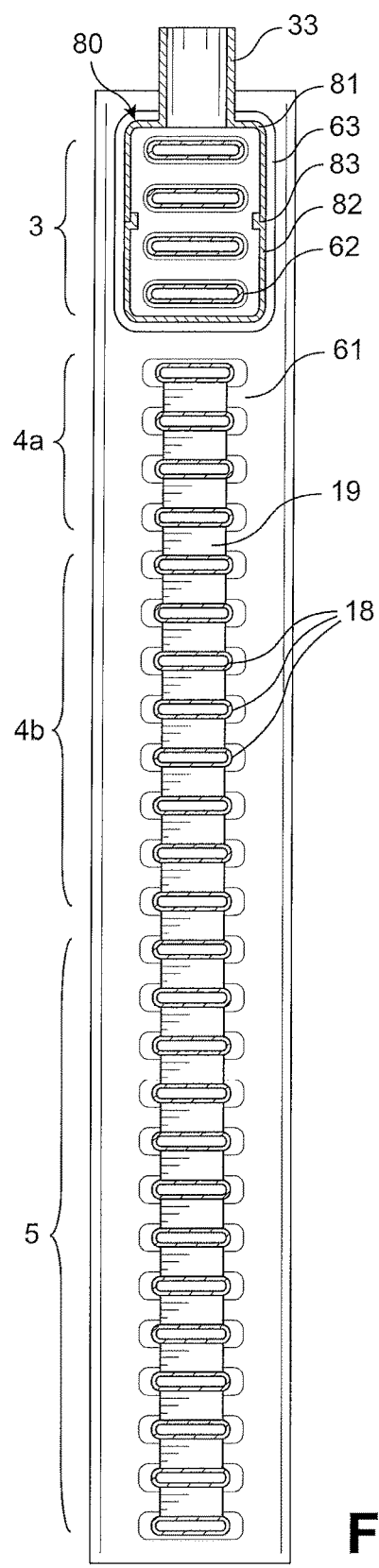
FIG. 3 is a cross-sectional elevational view of the integrated heat exchanger assembly as taken through section line 3-3 of FIG. 1.

A first collar structure 63 extends away from an outer surface of the first header 61 in a direction towards the second header tank 22. As best shown in FIG. 3, the first collar structure 63 extends circumferentially to form a closed perimeter shape such as a circular shape, an elliptical shape, a rectangular shape, a rounded rectangular shape, or the like, as desired. The first collar structure 63 is positioned to intersect the first header 61 while surrounding each of the first tube openings 62 associated with the first tubes 3 of the liquid cooled condenser core 12.

The first collar structure 63 may be formed integrally with the remainder of the first header 61 in a suitable manufacturing process. Alternatively, the first collar structure 63 may be formed separately in a suitable manufacturing process before being coupled to the outer surface of the first header 61 using a suitable coupling method. If formed separately, the first collar structure 63 may be a stamped component including a projection of the closed perimeter shape that is subsequently coupled to the outer surface of the first header 61 by any suitable coupling method, including brazing, welding, or the use of traditional fasteners, as non-limiting examples.

The first collar structure 63 may be formed from a metallic material such as aluminum or an alloy thereof. The first collar structure 63 may be at least partially coated with a suitable brazing material for initiating a brazing process. The first collar structure 63 may be formed from the same common material as the first header 61 and each of the heat exchanger tubes 18, as desired.

As shown in FIG. 2, the first casing 60 is divided into a first refrigerant chamber 64 and a first coolant chamber 65. The first refrigerant chamber 64 is fluidly separated from the first coolant chamber 65 by a first partition 66. The first partition 66 extends across a cross-section of the first casing 60 and may be formed integrally with the remainder of the first casing 60 or may be an insert disposed within the hollow interior of the first casing 60.

The first header tank 20 includes a first coolant port 31 providing fluid communication between the first coolant chamber 65 and a cooling circuit of a cooling system of the motor vehicle. The first coolant port 31 is illustrated as a cylindrical conduit, but the first coolant port 31 may have any suitable structure without departing from the scope of the present invention. The first coolant port 31 may be configured for coupling to a fitting assembly associated with the cooling circuit, as desired. The first coolant port 31 may be configured to act as one or both of an inlet or an outlet for the liquid coolant based on an operating mode of the cooling circuit having the air cooled condenser core 14.

The second header tank 22 may include a second casing 70 and a second header 71. The second header 71 includes a plurality of spaced apart second tube openings 72 with each of the second tube openings 72 configured to receive an end portion of one of the heat exchanger tubes 18 therein. The second casing 70 defines a hollow interior of the second header tank 22. The second header 71 may be coupled to the second casing 70 about a perimeter of an opening of the second casing 70 by any known method, including crimping, brazing, welding, or the use of fasteners, as desired. The second header 71 may extend along a length of the second header tank 22 in a manner wherein each of the heat exchanger cores 12, 14, 16 engages a portion of the second header 71. A suitable seal (not shown) may be compressed between the second header 71 and the second casing 70 for preventing leakage from the second header tank 22 depending on the form of the coupling between the second header 71 and the second casing 70. The second header 71 may include a peripheral rim or a plurality of circumferentially spaced tabbed portions suitable for being crimped to the second casing 70, as desired.

The second header 71 may be formed from a metallic material such as aluminum or an alloy thereof. The second header 71 may be at least partially coated with a suitable brazing material for initiating a brazing process. The second casing 70 may be formed from any suitable rigid material, such as the metallic material selected for the second header 71 and each of the heat exchanger tubes 18, or the rigid material may be a rigid plastic material, as desired.

The second header 71 is shown and described as a separately formed structure coupled to the second casing 70, but the second header tank 22 may have any suitable structure so long as a surface of the second header tank 22 having the second tube openings 72 faces towards the first header tank 20. As such, the second header 71 as used herein refers to a portion of the second header tank 22 facing towards the first header tank 20 and including the second tube openings 72 regardless of whether or not the second header 71 is formed separately from the remainder of the second casing 70.

A second collar structure 73 extends away from an outer surface of the second header 71 in a direction towards the first header tank 20. The second collar structure 73 extends circumferentially to form a closed perimeter shape such as a circular shape, an elliptical shape, a rectangular shape, a rounded rectangular shape, or the like, as desired. The second collar structure 73 is positioned to intersect the second header 71 while surrounding each of the second tube openings 72 associated with the first tubes 3 of the liquid cooled condenser core 12. The second collar structure 73 may be formed integrally with the remainder of the second header 71 in a suitable manufacturing process. Alternatively, the second collar structure 73 may be formed separately in a suitable manufacturing process before being coupled to the outer surface of the second header 71 using a suitable coupling method. If formed separately, the second collar structure 73 may be a stamped component including a projection of the closed perimeter shape that is subsequently coupled to the outer surface of the second header 71 by any suitable coupling method, including brazing, welding, or the use of traditional fasteners, as non-limiting examples.

The second collar structure 73 may be formed from a metallic material such as aluminum or an alloy thereof. The second collar structure 73 may be at least partially coated with a suitable brazing material for initiating a brazing process. The second collar structure 73 may be formed from the same common material as the second header 71 and each of the heat exchanger tubes 18, as desired.

The second casing 70 is divided into a second refrigerant chamber 74, a third refrigerant chamber 75, and a second coolant chamber 76. The second refrigerant chamber 74 is fluidly separated from the third refrigerant chamber 75 by a second partition 77. The third refrigerant chamber 75 is fluidly separated from the second coolant chamber 76 by a third partition 78. The second and third partitions 77, 78 extend across a cross-section of the second casing 70 and may be formed integrally with the remainder of the second casing 70 or may be inserts disposed within the hollow interior of the second casing 70.

The second header tank 22 includes a first refrigerant port 41 and a second refrigerant port 42. The first refrigerant port 41 provides fluid communication between the second refrigerant chamber 74 and a refrigerant circuit of the HVAC system. The second refrigerant port 42 provides fluid communication between the third refrigerant chamber 75 and the refrigerant circuit of the HVAC system. The first and second refrigerant ports 41, 42 are illustrated as cylindrical conduits, but the refrigerant ports 41, 42 may have any suitable structure without departing from the scope of the present invention. The first and second refrigerant ports 41, 42 may be configured for coupling to a fitting assembly of the refrigerant circuit, as desired. The first and second refrigerant ports 41, 42 may each be configured to act as one or both of an inlet or an outlet for the refrigerant based on an operating mode of the refrigerant circuit, as desired.

The second header tank 22 includes a second coolant port 32 providing fluid communication between the second coolant chamber 76 and the cooling circuit of the cooling system of the motor vehicle. The second coolant port 32 is illustrated as a cylindrical conduit, but the second coolant port 32 may have any suitable structure without departing from the scope of the present invention. The second coolant port 32 may be configured for coupling to a fitting assembly associated with the cooling circuit, as desired. The second coolant port 32 may be configured to act as one or both of an inlet or an outlet for the liquid coolant based on an operating mode of the cooling circuit.

The liquid cooled condenser core 12 further includes a housing 80 for defining a flow path for the liquid coolant to flow over the outer surface of each of the first tubes 3. The housing 80 extends longitudinally between the first collar structure 63 of the first header tank 20 and the second collar structure 73 of the second header tank 22. The housing 80 may be substantially tubular and open at each end thereof. A cross-sectional perimeter shape of the housing 80 corresponds to a perimeter shape of the first and second collar structures 63, 73 in a manner wherein the opposing open ends of the housing 80 are received within each of the collar structures 63, 73. The open ends of the housing 80 are accordingly placed within the collar structures 63, 73 of the headers 61, 71 to delimit a flow of a fluid therein in the longitudinal directions of the housing 80.

Figure 4:
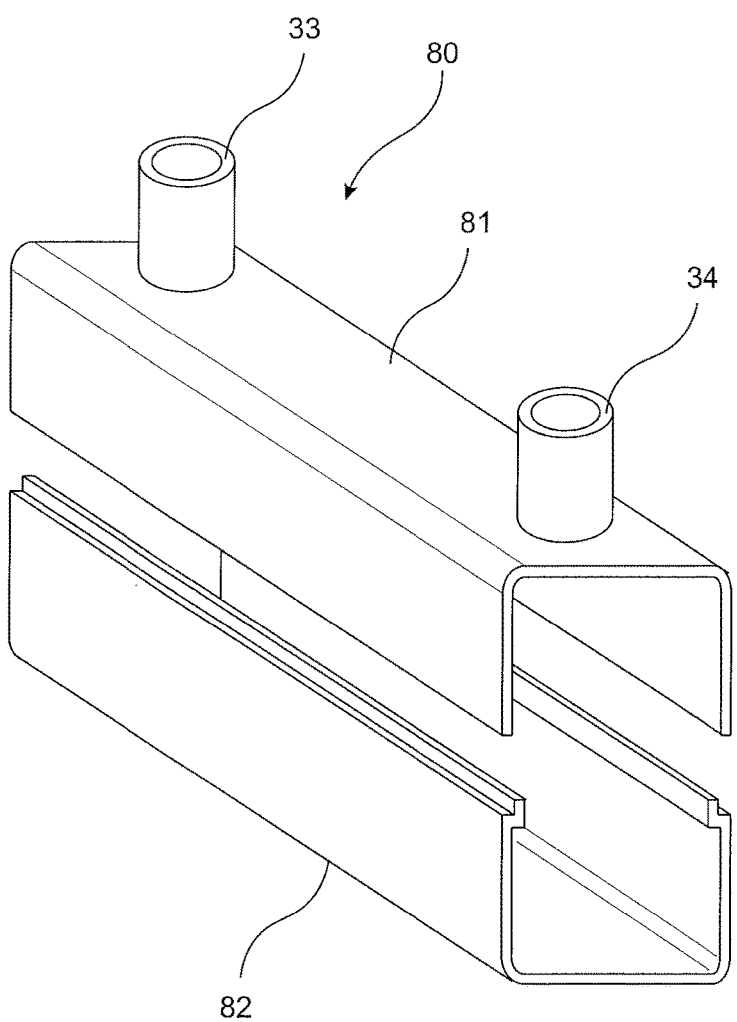
FIG. 4 is an exploded perspective view of two cooperating shells forming a housing of a liquid cooled heat exchanger core of the integrated heat exchanger assembly of FIGS. 1 and 2.

As best shown in FIG. 4, the housing 80 may be formed by the cooperation of a first shell 81 and a second shell 82, wherein the first shell 81 and the second shell 82 intersect each other at a longitudinally extending seam 83 (FIGS. 1 and 3). The housing 80 may be dimensioned to allow a clearance to be present between an outer surface of each of the first tubes 3 and an inner surface of the housing 80 in a manner allowing for the liquid coolant to reach the entirety of the outer surface of each of the first tubes 3 disposed within the housing 80.

The housing 80 includes a third coolant port 33 adjacent a first end of the first shell 81 and a fourth coolant port 34 adjacent a second end of the first shell 81. The third and fourth coolant ports 33, 34 each provide fluid communication between a hollow interior of the housing 80 and the cooling circuit of the cooling system. The third and fourth coolant ports 33, 34 are illustrated as cylindrical conduits, but the coolant ports 33, 34 may have any suitable structure without departing from the scope of the present invention. The coolant ports 33, 34 may each be configured for coupling to a fitting assembly associated with the cooling circuit, as desired. The coolant ports 33, 34 may be configured to act as one or both of an inlet or an outlet for the liquid coolant based on an operating mode of the cooling circuit, as desired.

As shown throughout FIGS. 1-3, a fin structure 19 may be disposed between adjacent ones of the second tubes 4 and the third tubes 5 forming the air cooled condenser core 14 and the low temperature radiator core 16, respectively. The fin structures 19 are configured to increase a heat exchanging surface associated with each of the heat exchanger tubes 18 for increasing the heat exchange efficiency thereof.

The first tubes 3 are shown in FIG. 2 as devoid of the fin structures 19 or any similar surface area increasing structure, but it should be understood that such surface area increasing structures may be utilized within the housing 80 and between adjacent ones of the first tubes 3 without necessarily departing from the scope of the present invention. The surface area increasing structures may be configured to add turbulence to the liquid coolant flowing therethrough without introducing an excessive pressure drop in the liquid coolant. If fin structures are used, the fin structures may be arranged perpendicular to the fin structures 19 to allow for the liquid coolant to flow in a longitudinal direction of the housing 80 without significant interference from the fin structures, as desired.

FIG. 3 illustrates a cross-sectional shape of each of the heat exchanger tubes 18. The embodiment illustrated in FIG. 3 includes each of the heat exchanger tubes 18 (including the first tubes 3, the first set 4a of the second tubes 4, the second set 4b of the second tubes 4, and the third tubes 5) as having a common height in a direction perpendicular to the longitudinal direction thereof. However, the first tubes 3 are illustrated as having a greater width than the second tubes 4 or the third tubes 5 in a lateral direction of each of the heat exchanger tubes 18, hence the first tubes 3 are shown as having a larger hydraulic diameter than the second tubes 4 or the third tubes 5. As is understood in the art, the hydraulic diameter of a heat exchanger tube affects the heat exchange efficiency thereof by altering a ratio of exposed surface area to a flow area through the corresponding heat exchanger tube. The first tubes 3 may accordingly be selected to include the larger hydraulic diameter in order to facilitate more efficient heat transfer between the refrigerant flowing through the first tubes 3 and the liquid coolant passing over the first tubes 3. In other embodiments, the width of the first tubes 3 may be selected to be the same as the second tubes 4 and the third tubes 5 while the height of the first tubes 3 is increased to result in the increased hydraulic diameter in comparison to the second and third tubes 4, 5.

However, the first tubes 3, the second tubes 4, and the third tubes 5 may be selected to have any combination of sizes and shapes without departing from the scope of the present invention. The size and shape of each of the heat exchanger tubes 18 forming each of the independent sets of the tubes 3, 4, 5 may be selected to tune each of the heat exchanger cores 12, 14, 16 of the heat exchanger assembly 10 to have a desired heat exchange efficiency based on desired operation of the cooling system or the HVAC system associated with the heat exchanger assembly 10. For example, in some embodiments, all three of the first tubes 3, the second tubes 4, and the third tubes 5 may be selected to include the same size and shape and hence the same hydraulic diameter. In other embodiments, each of the first tubes 3, the second tubes 4, and the third tubes 5 may be selected to include at least one variable dimension for presenting variable hydraulic diameters among the different tubes 3, 4, 5.

In other embodiments, only one of the second tubes 4 or the third tubes 5 is selected to have different dimensions from the remaining heat exchanger tubes 18.

The heat exchanger tubes 18 are also illustrated in FIG. 3 as being uniformly spaced from one another with respect to the longitudinal direction of the header tanks 20, 22, but it should be further understood that the spacing of the heat exchanger tubes 18 may be varied between the different sets 3, 4, 5 of tubes 18 without departing from the scope of the present invention. For example, the first tubes 3 disposed within the housing 80 may be spaced at different intervals in comparison to the second or third tubes 4, 5 forming the heat exchanger cores 14, 16 in order to account for the use of an alternative heat exchanging fluid passing over the first tubes 3 in comparison to the second and third tubes 4, 5. The spacing between adjacent ones of the heat exchanger tubes 18 may be selected to tune each of the heat exchanger cores 12, 14, 16 to include a desired heat exchange efficiency in accordance with the requirements of the cooling system or the HVAC system associated with the heat exchanger assembly 10.

The heat exchanger assembly 10 is illustrated in FIGS. 1 and 2 as including a fluid line 50 extending between and fluidly coupling the fourth coolant port 34 of the housing 80 and the second coolant port 32 of the second header tank 22. The fluid line 50 may be formed from a rigid material such as a metallic material suitable for a brazing process, such as aluminum or an alloy thereof. The ends of the fluid line 50 may include a coating of a suitable brazing material for initiating a brazing process for coupling the ends of the fluid line 50 to the second and fourth coolant ports 32, 34, thereby providing a fluid tight seal at a junction of the fluid line 50 and each of the coolant ports 32, 34. Alternatively, the fluid line 50 may be securely coupled to the second and fourth coolant ports 32, 34 using any coupling method, including the use of threaded fasteners, welding, crimping, or the like, as desired.

The heat exchanger assembly 10 has been described herein as including various components suitable for initiating a brazing process when assembling the heat exchanger assembly 10. It may accordingly be beneficial for the various components of the heat exchanger assembly 10 to be formed as common materials suitable for undergoing a brazing process or complimentary materials suitable for joining during a brazing process in order to reduce the number and types of manufacturing steps required for assembling the heat exchanger assembly 10. For example, the exchanger tubes 18, the fin structures 19, the first header 61, the second header 62, the first casing 60, the second casing 70, the first collar structure 63, the second collar structure 64, the fluid line 50, the first shell 81 of the housing 80, the second shell 82 of the housing 80, and the coolant ports 32, 34 may be formed from common or complimentary materials suitable for undergoing a brazing process in order to couple multiple components to each other during a single manufacturing step. However, it should also be understood that any combination of manufacturing processes may be utilized for forming the heat exchanger assembly 10 in the configuration disclosed herein while still maintaining the operational benefits of the disclosed configuration as described hereinafter.

The heat exchanger cores 12, 14, 16 of the heat exchanger assembly 10 are all arranged in parallel along a common plane (the plane of the page with reference to FIG. 1). The common plane having each of the heat exchanger cores 12, 14, 16 arranged thereon is arranged perpendicular to a direction of flow of the ambient air through either of the air passed heat exchanger cores 14, 16. The common plane also passes through the fluid conveying portions of the first header tank 20 and the second header tank 22. The arrangement of each of the heat exchanger cores 12, 14, 16 along a common plane ensures that a circumstance does not exist in which the ambient air passing over the heat exchanger assembly 10 must subsequently pass through two or more heat exchanger cores, thereby ensuring that none of the heat exchanger cores 12, 14, 16 exchanges heat energy with ambient air that has already passed through and exchanged heat energy via another of the heat exchanger cores 12, 14, 16.

FIGS. 5-8 illustrate various exemplary flow configurations of the heat exchanger assembly 10 relative to each of a coolant circuit 90 of a cooling system of the motor vehicle and a refrigerant circuit 100 of an HVAC system of the motor vehicle. The coolant circuit 90 may be configured for cooling at least one heat generating component 91 associated with operation of the motor vehicle. The at least one heat generating component 91 may be an electric motor, a battery, an inverter, and combinations thereof, as non-limiting examples. The heat exchanger assembly 10 may accordingly be suitable for use with an electric or hybrid vehicle having electrical components in need of cooling during operation of the electric vehicle. The coolant circuit 90 also includes a pump 92 for causing the liquid coolant to circulate through the coolant circuit 90 in a desired flow direction.

The refrigerant circuit 100 is configured to convey the refrigerant passing through the heat exchanger assembly 10 to the remaining air conditioning components 101 forming the refrigerant circuit, such as a compressor (not shown), an expansion member (not shown), and an evaporator (not shown), as desired. The heat exchanger assembly 10 may be disposed immediately downstream of the compressor of the air conditioning components 101 with respect to a direction of flow of the refrigerant through the refrigerant circuit 100, as desired.

It should be understood that the schematic representations of the at least one heat generating component 91 and the air conditioning components 101 may be representative of more complex flow configurations than the direct connections shown in FIGS. 5-8. For example, the schematic representation of the at least one heat generating component 91 may be representative of a series of fluid lines, valves, and the like for controlling a heat exchange relationship between the liquid coolant and each of the heat generating components associated with the coolant circuit 90. The at least one heat generating component 91 therefore represents any system of fluid connections wherein the liquid coolant is directed to exchange heat energy with a heat generating component when not flowing through a portion of the heat exchanger assembly 10.

Similarly, the air conditioning components 101 may represent any series of flow configurations and components associated with passing the refrigerant through the air conditioning circuit 100 in accordance with a desired method of operation of the refrigerant circuit 100. For example, any series of valves, fluid lines, or additional air conditioning related components may be present between the first and second refrigerant ports 41, 42 in addition to the previously mentioned components without necessarily departing from the scope of the present invention, including components such as an inner heat exchanger (not shown), a receiver dryer (not shown), or any additional heat exchangers (not shown). The air conditioning components 101 may be configured in a manner wherein flow to and from the heat exchanger assembly 10 is reversed based on a selected operating mode of the refrigerant circuit 100, as desired. However, it is assumed hereinafter that the refrigerant exiting the air conditioning components 101 has been compressed in a manner wherein the refrigerant has a relatively high or maximized temperature and pressure when entering the first refrigerant port 41. The refrigerant entering the first refrigerant port 41 may accordingly be a superheated gaseous form of the refrigerant.

The liquid cooled condenser core 12 and the air cooled condenser core 14 are each described as condensers, but it should be understood by one skilled in the art that the heat exchanger cores 12, 14 may alternatively be referred to as "gas coolers" in circumstances wherein the gaseous refrigerant is cooled and not necessarily condensed when passing through one or both of the heat exchanger cores 12, 14.

Figure 5:
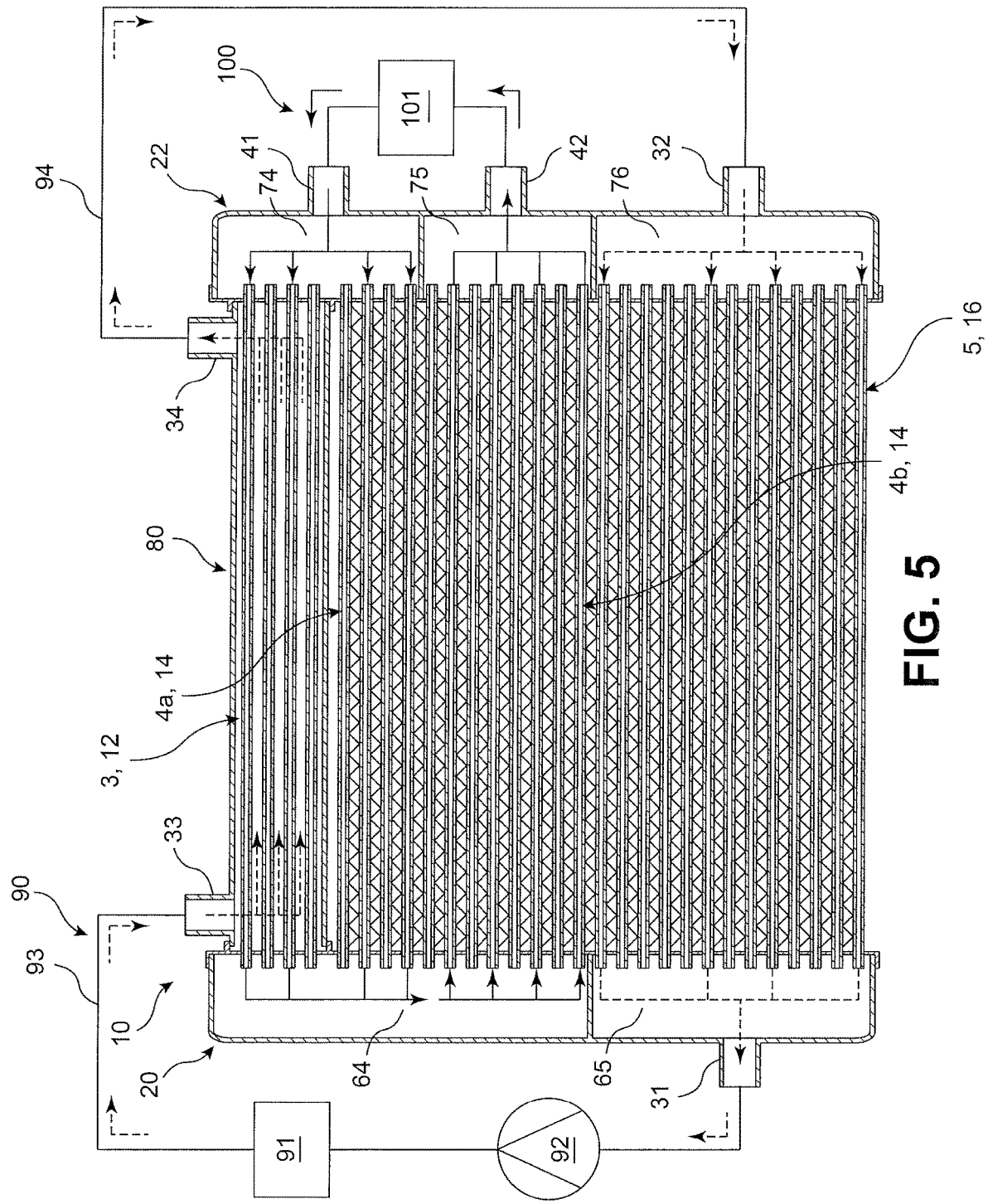
FIG. 5 illustrates a first flow configuration of the integrated heat exchanger assembly of FIGS. 1 and 2 relative to each of a cooling circuit and a refrigerant circuit according to an embodiment of the invention.

FIG. 5 illustrates a first flow configuration of the heat exchanger assembly 10, the cooling circuit 90, and the refrigerant circuit 100. The cooling circuit 90 includes a first cooling circuit line 93 and a second cooling circuit line 94. The first cooling circuit line 93 extends between and fluidly couples the first coolant port 31 of the first header tank 20 and the third coolant port 33 of the housing 80 of the liquid cooled condenser core 12. The second cooling circuit line 94 extends between and fluidly couples the fourth coolant port 34 of the housing 80 and the second coolant port 32 of the second header tank 22. With renewed reference to FIGS. 1 and 2, the second cooling circuit line 94 may be formed by the rigid fluid line 50 securely coupled to the fourth coolant port 34 and the second coolant port 32, as described hereinabove.

The first cooling circuit line 93 includes the pump 92 and the at least one heat generating component 91. The pump 92 causes the liquid coolant to flow in a direction from the first coolant port 31 and toward the third coolant port 33 when flowing through the first cooling circuit line 93.

In operation, the liquid coolant is caused to flow through the at least one heat generating component 91 via the pump 92 when flowing through the first cooling circuit line 93. The liquid coolant receives heat energy from the at least one heat generating component 91 to increase the temperature of the liquid coolant and decrease the temperature of the at least one heat generating component 91. The liquid coolant is increased in temperature to a temperature below the temperature of the refrigerant entering the first refrigerant port 41 of the heat exchanger assembly 10.

The liquid coolant then enters the hollow interior of the housing 80 via the third coolant port 33. Concurrently, the refrigerant enters the second refrigerant chamber 74 of the second header tank 22 where the refrigerant is distributed to the first tubes 3 of the liquid cooled condenser core 12 and the first set 4a of the second tubes 4 of the air cooled condenser core 14. The liquid coolant passes over the outer surface of each of the first tubes 3 forming the liquid cooled condenser core 12 to exchange heat energy with the refrigerant conveyed within the first tubes 3. The liquid coolant receives heat energy from the high temperature refrigerant to increase the temperature of the liquid coolant while decreasing the temperature of the refrigerant. The liquid coolant flows in a direction from the third coolant port 33 to the fourth coolant port 34 to establish a counter-flow arrangement between the refrigerant and the liquid coolant. The refrigerant passing through the first set 4a of the second tubes 4 exchanges heat energy with a portion of the ambient air passing between adjacent ones of the second tubes 4 of the first set 4a to increase a temperature of the portion of the ambient air while decreasing a temperature of the refrigerant.

The refrigerant passing through the first tubes 3 and the first set 4a of the second tubes 4 is recombined within the first refrigerant chamber 64 of the first header tank 20 before being distributed to the second set 4b of the second tubes 4. The refrigerant passes through the second set 4b of the second tubes 4 in a direction opposite the flow of the refrigerant through the first tubes 3 and the first set 4a of the second tubes 4. The refrigerant passing through the second set 4b of the second tubes 4 exchanges additional heat energy with another portion of the ambient air passing between adjacent ones of the second tubes 4 of the second set 4b. The refrigerant is then recombined within the third refrigerant chamber 75 before exiting the heat exchanger assembly 10 via the second refrigerant port 42.

The liquid coolant exiting the housing 80 via the fourth coolant port 34 flows through the second coolant circuit line 94 (fluid line 50) and to the second coolant port 32 of the second header tank 22. The liquid coolant is distributed to the third tubes 5 of the low temperature radiator core 16 within the second coolant chamber 76 of the second header tank 22. The liquid coolant exchanges heat energy with a another portion of the ambient air passing between adjacent ones of the third tubes 5 to decrease a temperature of the liquid coolant while increasing a temperature of the portion of the ambient air. The liquid coolant is cooled in the low temperature radiator core 16 to a temperature below a temperature of the at least one heat generating component 91 to allow for the liquid coolant to receive heat energy from the at least one heat generating component 91. The liquid coolant is then recombined within the first coolant chamber 65 of the first header tank 20 before exiting the heat exchanger assembly 10 via the first coolant port 31. The liquid coolant is then able to recirculate through the coolant circuit 90 once again in the manner described herein.

Figure 6:
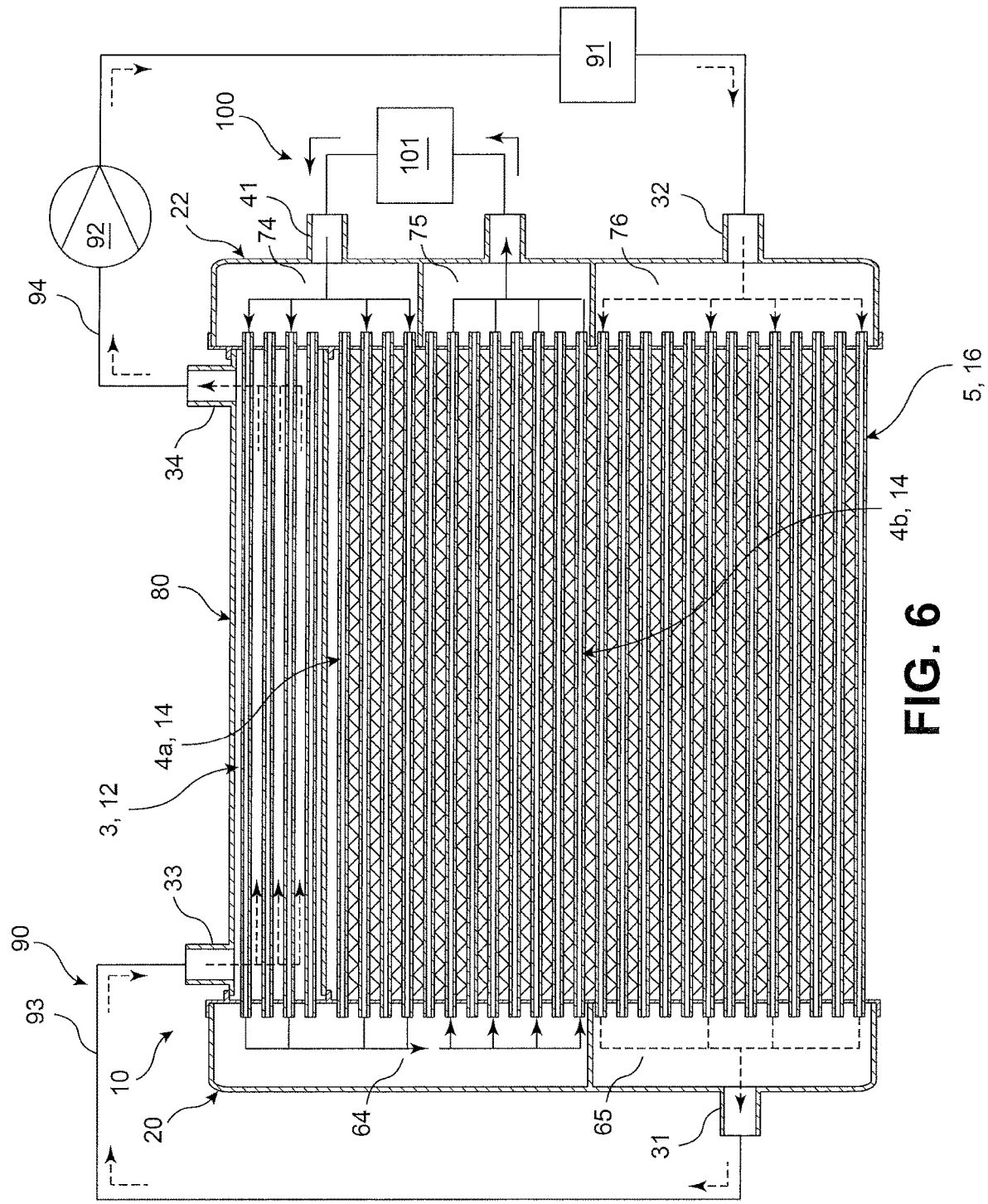
FIG. 6 illustrates a second flow configuration of the integrated heat exchanger assembly of FIGS. 1 and 2 relative to a cooling circuit and a refrigerant circuit according to another embodiment of the invention.

FIG. 6 illustrates a second flow configuration of the heat exchanger assembly 10, the coolant circuit 90, and the refrigerant circuit 100. The second flow configuration is substantially identical to the first flow configuration except the pump 92 and the at least one heat generating component 91 are disposed in series on the second coolant circuit line 94 rather than the first coolant circuit line 93. As such, the first coolant circuit line 93 may be formed as a rigid conduit securely coupled to each of the first coolant port 31 and the third coolant port 33 in similar fashion to the fluid line 50 described with reference to FIGS. 1 and 2 due to the lack of intervening components between the first and third coolant ports 31, 33. The second coolant circuit line 94 is accordingly not formed as the rigid and continuous fluid line 50 due to the introduction of the pump 92 and the at least one heat generating component 91 between the fourth coolant port 34 and the second coolant port 32.

The second flow configuration includes the liquid coolant and the refrigerant flowing through the heat exchanger assembly 10, the coolant circuit 90, and the refrigerant circuit 100 in the same order as disclosed above with respect to the first flow configuration. However, the repositioning of the at least one heat generating component 91 alters the heat exchange relationship present between each of the associated heat exchanging fluids.

In operation, the liquid coolant flowing through the second coolant circuit line 94 flows through the at least one heat generating component 91 to increase the temperature of the liquid coolant while decreasing the temperature of the at least one heat generating component 91. The heated liquid coolant then flows through the low temperature radiator core 16 to decrease the temperature of the liquid coolant while increasing the temperature of the portion of the ambient air passing over the low temperature radiator core 16. The liquid coolant then flows into the housing 80 where the liquid coolant has a lower temperature than the refrigerant flowing through the first tubes 3 forming the liquid cooled condenser core 12. The refrigerant is accordingly decreased in temperature while the liquid coolant is increased in temperature to a temperature below that of the at least one heat generating component 91 to maintain a cooling effect of the liquid coolant with respect to the at least one heat generating component 91. The liquid coolant is then able to pass through the at least one heat generating component 91 once again to repeat the cycle.

Figure 7:
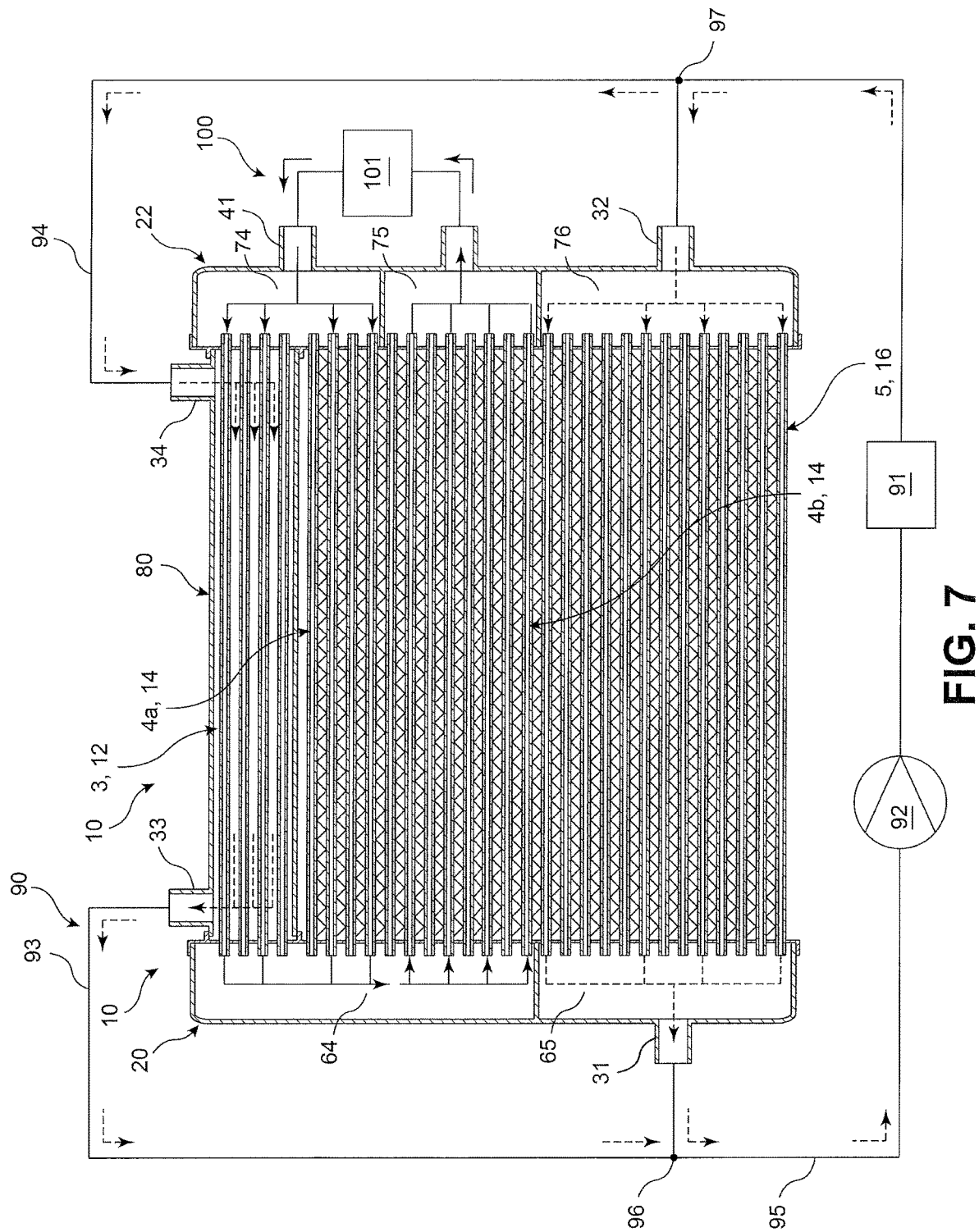
FIG. 7 illustrates a third flow configuration of the integrated heat exchanger assembly of FIGS. 1 and 2 relative to a cooling circuit and a refrigerant circuit according to another embodiment of the invention.

FIG. 7 illustrates a third flow configuration of the heat exchanger assembly 10, the coolant circuit 90, and the refrigerant circuit 100. The third flow configuration includes the coolant circuit 90 having the first coolant circuit line 93 extending between the first and third coolant ports 31, 33, the second coolant circuit line 94 extending between the second and fourth coolant ports 32, 34, and an additional third coolant circuit line 95 extending between a first branch point 96 disposed on the first coolant circuit line 93 and a second branch point 97 disposed on the second coolant circuit line 94. The third flow configuration includes the pump 92 and the at least one heat generating component 91 disposed on the third coolant circuit line 95 with the pump causing the liquid coolant to flow through the third coolant circuit line 95 in a direction from the first branch point 96 to the second branch point 97.

In operation, the liquid coolant exchanges heat energy with the at least one heat generating component 91 while passing through the third coolant circuit line 95 to increase the temperature of the liquid coolant while decreasing the temperature of the at least one heat generating component 91. The liquid coolant is then divided at the second branch point 97 into a first partial flow towards the second coolant port 32 of the second header tank 22 and a second partial flow towards the fourth coolant port 34 of the housing 80. The first partial flow of the liquid coolant passes through the low temperature radiator core 16 to decrease the temperature of liquid coolant while increasing the temperature of the portion of the ambient air passing over the low temperature radiator core 16. The second partial flow of the liquid coolant passes through the housing 80 to decrease the temperature of the refrigerant passing through the first tubes 3 forming the liquid cooled condenser core 12 while increasing the temperature of the second partial flow of the liquid coolant. The first partial flow and the second partial flow of the liquid coolant are then recombined at the first branch point 96, wherein the combination of the first partial flow and the second partial flow results in the liquid coolant having a temperature below the temperature of the at least one heat generating component 91 to maintain the cooling effect of the liquid coolant. The process is then repeated as disclosed above.

Figure 8:
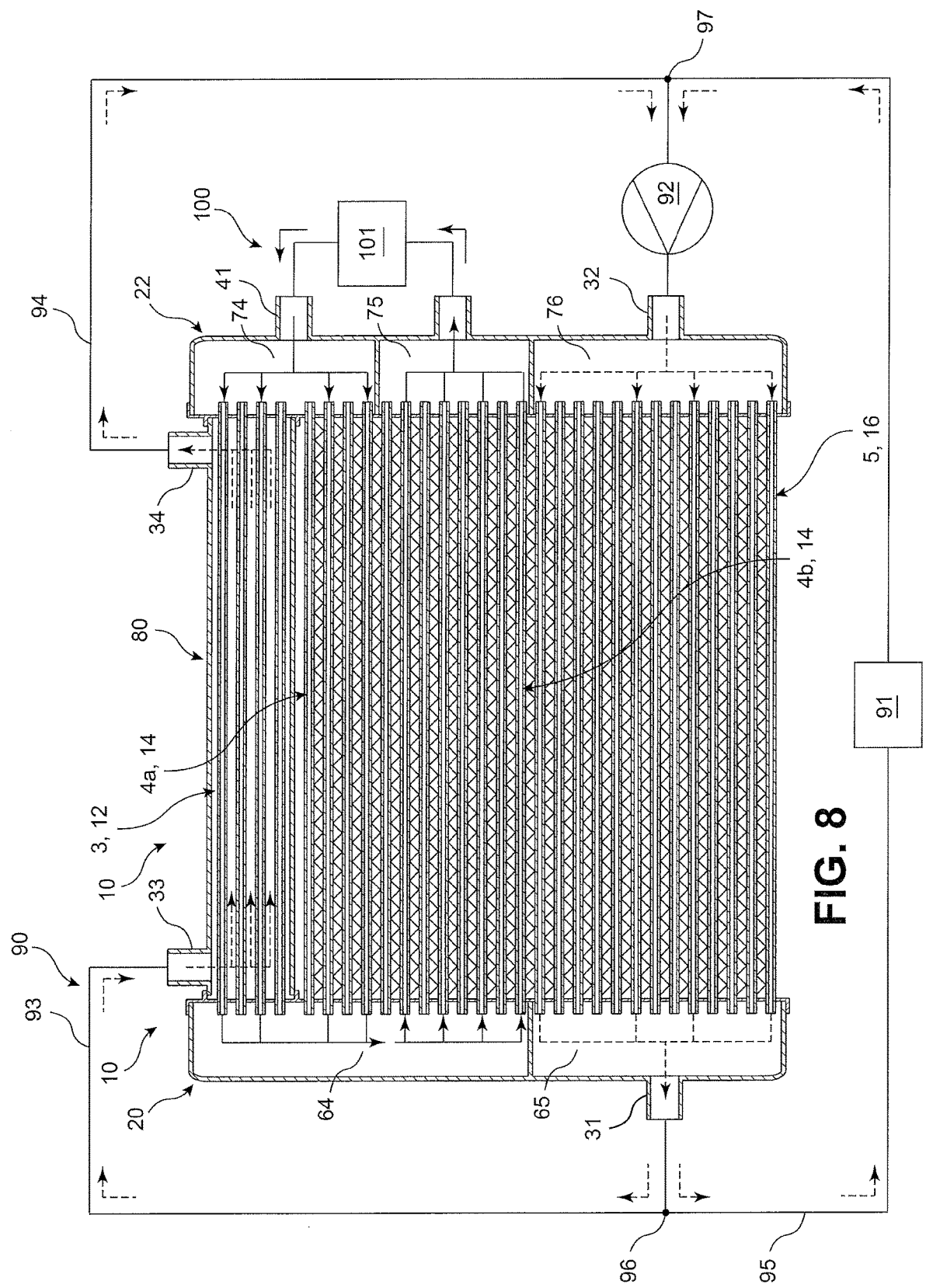
FIG. 8 illustrates a fourth flow configuration of the integrated heat exchanger assembly of FIGS. 1 and 2 relative to a cooling circuit and a refrigerant circuit according to another embodiment of the invention.

FIG. 8 illustrates a fourth flow configuration of the heat exchanger assembly 10, the coolant circuit 90, and the refrigerant circuit 100. The coolant circuit 90 is substantially identical to the coolant circuit 90 as disclosed in FIG. 7 except the pump 92 has been repositioned to be disposed between the second branch point 97 and the second coolant port 32 on the second coolant circuit line 94.

In operation, the liquid coolant is caused to flow through the low temperature radiator core 16 via operation of the pump 92 in order to decrease the temperature of the liquid coolant while increasing the temperature of the portion of the ambient air passing over the low temperature radiator core 16. The liquid coolant is then divided at the first branch point 96 into a first partial flow through the first coolant circuit line 93 and a second partial flow through the third coolant circuit line 95. The first partial flow of the liquid coolant flows through the housing 80 in order to decrease the temperature of the refrigerant flowing through the first tubes 3 forming the liquid cooled condenser core 12 while increasing the temperature of the first partial flow of the liquid coolant. The second partial flow of the liquid coolant flows through the third coolant circuit line 95 and encounters the at least one heat generating component 91. The second partial flow of the liquid coolant is increased in temperature while the at least one heat generating component 91 is decreased in temperature. The first and second partial flows are then recombined at the second branch point 97 to repeat the above described process.

Figure 9:
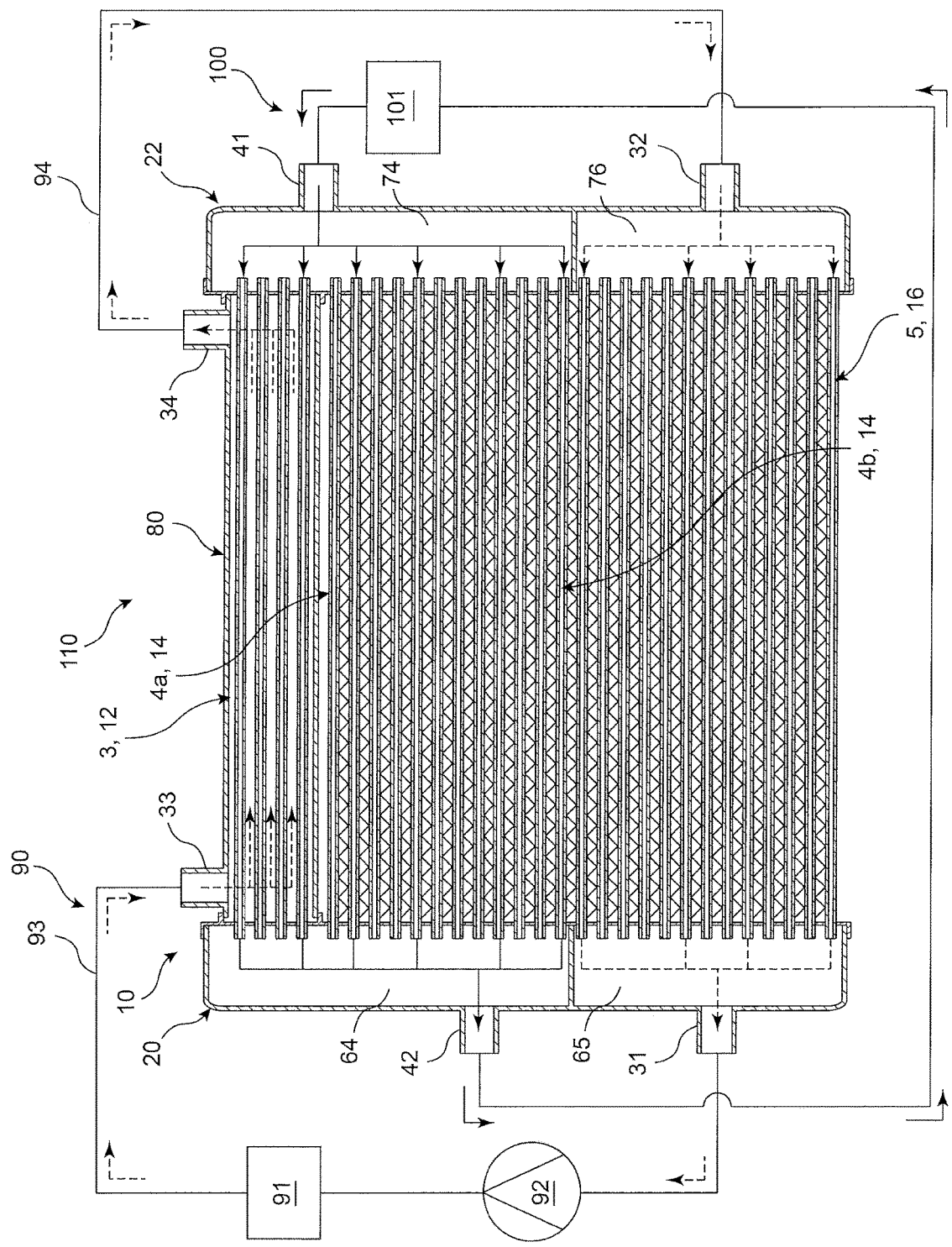
FIG. 9 is a cross-sectional elevational view illustrating a flow configuration through an integrated heat exchanger assembly, a coolant circuit, and a refrigerant circuit according to another embodiment of the present invention.

FIG. 9 illustrates a heat exchanger assembly 110 according to another embodiment of the invention. The heat exchanger assembly 110 is substantially similar to the heat exchanger assembly 10 except the second refrigerant port 42 has been repositioned from the second header tank 22 to the first header tank 20. The repositioning of the second refrigerant port 42 also results in the second partition 77 being removed from the second header tank 22 to allow for the refrigerant entering the second header tank 22 to be divided between the liquid cooled condenser core 12 and the air cooled condenser core 14. As such, the refrigerant passes through the air cooled condenser core 14 only once in a single direction, as opposed to the two passes of the refrigerant through the first and second sets 4a, 4b of the second tubes 4 as shown and described with reference to the first through fourth flow configurations. The heat exchanger assembly 110 otherwise operates in the same manner as disclosed with reference to the first flow configuration and the heat exchanger assembly 10.

Figure 10:
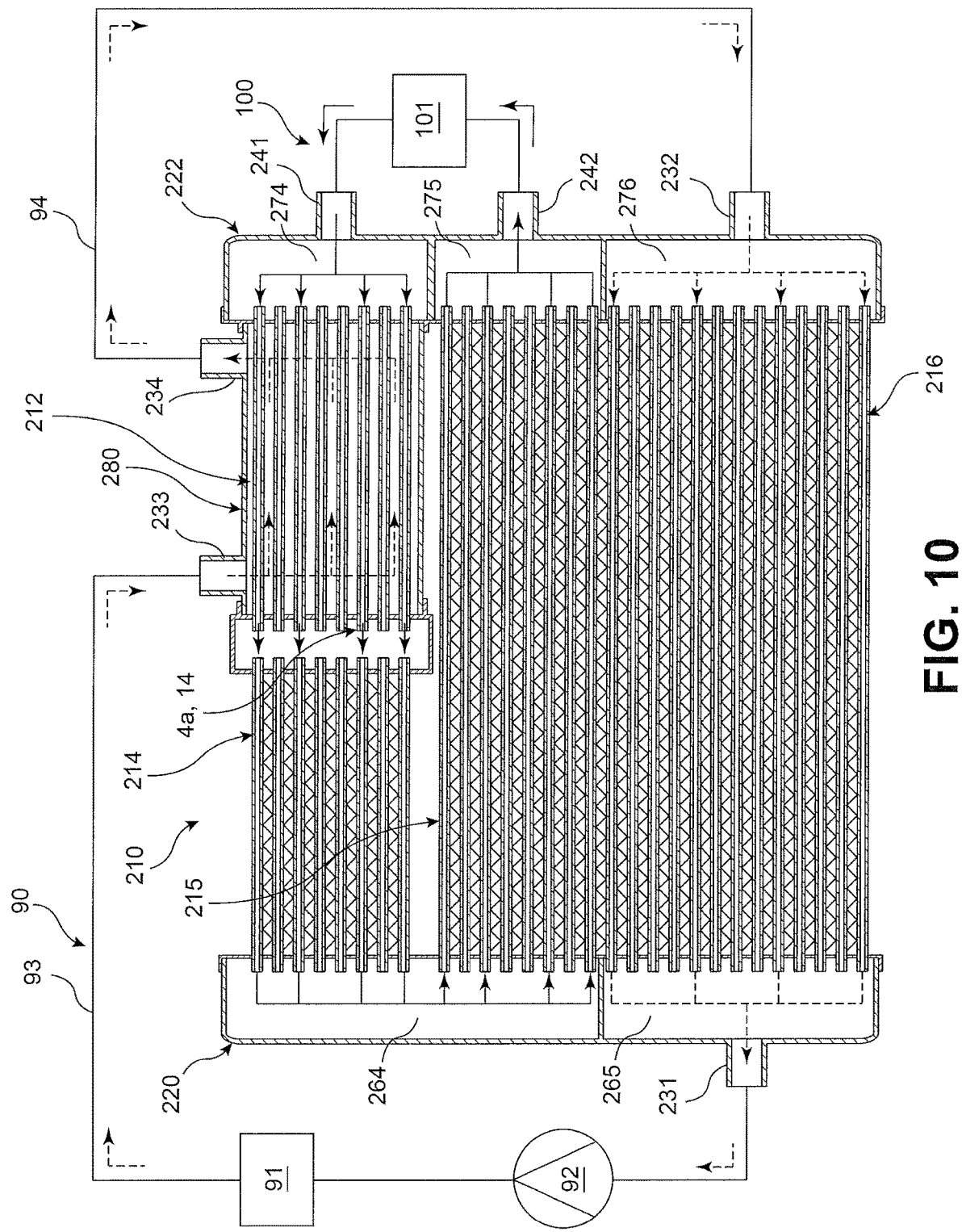
FIG. 10 is a cross-sectional elevational view illustrating a flow configuration through an integrated heat exchanger assembly, a coolant circuit, and a refrigerant circuit according to yet another embodiment of the present invention.

FIG. 10 illustrates a heat exchanger assembly 210 according to another embodiment of the present invention. The heat exchanger assembly 210 includes a liquid cooled condenser core 212, a first air cooled condenser core 214, a second air cooled condenser core 215, and a low temperature radiator core 216. The heat exchanger assembly 210 further includes a first header tank 220 at a first end of the array of heat exchanger cores 212, 214, 215, 216 and a second header tank 222 at a second end of the array of the heat exchanger cores 212, 214, 215, 216. The first header tank 220 is divided into a first refrigerant chamber 264 and a first coolant chamber 265. The second header tank 222 is divided into a second refrigerant chamber 274, a third refrigerant chamber 275, and a second coolant chamber 276.

A first coolant port 231 of the first header tank 220 fluidly couples the first coolant chamber 265 to the coolant circuit 90 of an associated cooling system of the motor vehicle. The first header tank 220 further includes a first refrigerant port 241 fluidly coupling the second coolant chamber 274 to the refrigerant circuit 100 of an associated HVAC system of the motor vehicle and a second refrigerant port 242 fluidly coupling the third refrigerant chamber 275 to the refrigerant circuit 100. A second coolant port 232 of the second header tank 222 fluidly couples the second coolant chamber 276 to the coolant circuit 90.

A third header tank 224 is disposed intermediate the liquid cooled condenser core 212 and the first air cooled condenser core 214. The third header tank 224 may be formed from a pair of cooperating shells in similar fashion to each of the first header tank 20, the second header tank 22, or the housing 80 as shown and described with reference to the heat exchanger assembly 10 disclosed in FIGS. 1 and 2. Each of the shells may include a plurality of tubes openings for receiving the ends of the heat exchanger tubes forming the liquid cooled condenser core 212 and the first air cooled condenser core 214. The third header tank 224 may be formed from a metallic material at least partially coated with a brazing material for initiating a brazing process.

The liquid cooled condenser core 212 comprises a housing 280 defining a hollow opening for circulating the liquid coolant. The housing 280 may be substantially similar to the housing 80 of the heat exchanger assembly 10, including being formed from a suitable metallic material for use in a brazing process. The housing 280 may be coupled to each of the second header tank 220 and the third header tank 224 in similar fashion to the manner in which the housing 80 is coupled to the first header tank 20 and the second header tank 22 with respect to the heat exchanger assembly 10, including the use of opposing collar structures for locating the housing 280 relative to the second and third header tanks 222, 224.

The housing 280 includes a third coolant port 233 and a fourth coolant port 234 adjacent opposing ends thereof. The third and fourth coolant ports 233, 234 fluidly couple the interior of the housing 280 to the coolant circuit 90.

The coolant circuit 90 and the refrigerant circuit include the same configuration as disclosed with reference to FIG. 5 and the first flow configuration of the heat exchanger assembly 10, including the first coolant circuit line 93 coupling the first coolant port 231 to the third coolant port 233 while having the pump 92 and the at least one heat generating component 91 and the second coolant circuit line 94 coupling the second coolant port 232 to the fourth coolant port 234. The refrigerant circuit 100 similarly couples the first refrigerant port 241 to the second refrigerant port 242 in similar fashion to the disclosed first flow configuration of the heat exchanger assembly 10.

In operation, the liquid coolant first flows through the first coolant circuit line 93 and hence the at least one heat generating component 91 to increase the temperature of the liquid coolant while decreasing the temperature of the at least one heat generating component. The liquid coolant is heated to a temperature below the temperature of the refrigerant entering the second refrigerant chamber 274 through the first refrigerant port 241. The refrigerant first flows through the heat exchanger tubes forming the liquid cooled condenser core 212 to decrease the temperature of the refrigerant while increasing the temperature of the liquid coolant. The liquid coolant then flows through the second coolant circuit line 94 to the second coolant chamber 276. The liquid coolant exchanges heat energy with a portion of the ambient air passing over the low temperature radiator core 216 to decrease the temperature of the liquid coolant while increasing the temperature of the portion of the ambient air. The temperature of the liquid coolant is decreased to be lower than the temperature of the at least one heat generating component 91 to maintain the cooling effect of the liquid coolant. The liquid coolant is then recombined within the first coolant chamber 265 before passing once again through the first coolant circuit line 93.

Concurrently, after having passed through the liquid cooled condenser core 212, the refrigerant is passed in order through the third header tank 224, the first air cooled condenser core 214, the first refrigerant chamber 264 of the first header tank 220, the second air cooled condenser core 215, and finally the third refrigerant chamber 275 of the second header tank 222 before reentering the refrigerant circuit 90. The refrigerant exchanges heat energy with a first portion of the ambient air within the first air cooled condenser core 214 and a second portion of the ambient air within the second air cooled condenser core 215, wherein in each case the temperature of the refrigerant is decreased while the temperature of each respective portion of the ambient air in increased.

Throughout the descriptions of the disclosed flow configurations it is generally assumed that the temperature of each of the heat exchanging fluids is either higher or lower than another of the heat exchanging fluids at various points within each of the circuits of each of the heat exchanging fluids. However, it should be understood that under some circumstances, such as following the initial activation of one of more components associated with operation of the motor vehicle or following an extended period of inactivity thereof, that such relationships may not be maintained throughout operation of each of the disclosed heat exchanger assemblies 10, 110, 210. The disclosed relationships are accordingly representative of the desired operating conditions for a given operational mode of either of the cooling system or the HVAC system associated with respect to each of the disclosed heat exchanger assemblies 10, 110, 210.

FIGS. 1-10 generally illustrate each of the heat exchanger assemblies as including a configuration wherein the liquid cooled condenser core is disposed at an uppermost position of the assembly, the air cooled condenser core is disposed immediately below the liquid cooled condenser core in an intermediate position of the assembly, and the low temperature radiator core is disposed immediately below the air cooled condenser core at a lowermost position of the assembly. However, the configurations shown and described are not limiting, and the order and arrangement of each of the heat exchanger cores may be modified without necessarily departing from the scope of the present invention.

The integrated heat exchanger assemblies 10, 110, 210 disclosed herein provide numerous benefits over the stacked heat exchanger configurations of the prior art. First, the disposition of all heat exchanger cores along a common plane ensures that each of the air-passed heat exchanger cores is passed by air having not passed through another of the heat exchanger cores. As such, the low temperature radiator may have an increased heat exchange capacity in comparison to a low temperature radiator disposed downstream of an air passed condenser core as is known in the prior art.

Second, the use of the liquid cooled condenser core beneficially allows for an area of each of the heat exchanger assemblies 10, 110, 210 to be reduced with respect to the common plane occupied by each of the heat exchanger cores despite the elimination of the stacked configuration as commonly used in the prior art. This occurs because it is generally understood that a liquid coolant of the same temperature as the ambient air will exchange heat energy through each of the disclosed heat exchanger tubes much more efficiently and quickly than will the ambient air at the same temperature. As such, the use of a liquid coolant within a condenser or gas cooler allows for the same heat exchange capacity to be present between the refrigerant and the liquid coolant for a liquid cooled condenser core of relatively smaller size than a corresponding air cooled condenser core. In other words, the area occupied by the liquid cooled condenser core with respect to the common plane for a given heat exchange capacity is much smaller than the area occupied by a corresponding air cooled condenser core having the same heat exchange capacity. This saved area allows for the repositioning of the low temperature radiator core to the common plane instead of being stacked behind the air passed condenser core, thereby reducing a packaging space of each of the heat exchanger assemblies 10, 110, 210 while ensuring that each air passed heat exchanger core experiences air that has not encountered any of the other air passed heat exchanger cores.

Third, the integration of the liquid cooled condenser core between two header tanks eliminates additional components and fluid connections for achieving the same heat exchange relationships, thereby simplifying a manufacturing process of each of the disclosed heat exchanger assemblies 10, 110, 210.

Finally, as mentioned throughout, the disclosed configuration of each of the heat exchanger cores allows for each of the heat exchanger assemblies 10, 110, 210 to be tuned in a manner wherein each of the associated heat exchanger cores is configured to have a desired heat exchange capacity to allow for each of the heat exchanging fluids to be within a desired temperature range throughout each associated circuit. For example, the area occupied by the low temperature radiator core may be increased or decreased for some embodiments in order to place the liquid coolant at a desired temperature range when exchanging heat energy with the at least one heat generating component 91 or the refrigerant. As another example, a size and hence a heat exchange capacity of the liquid cooled condenser core may be varied to increase or decrease a size of the air cooled condenser core for achieving a desired degree of cooling of the refrigerant. Each of the heat exchanger assemblies 10, 110, 210 disclosed herein may accordingly be adapted for use in different motor vehicles having different cooling systems and HVAC systems without requiring significant modification of the disclosed configuration. In other words, the number and size of the heat exchanger tubes used may be varied for each of the different heat exchanger cores in order to adapt each of the integrated heat exchanger assemblies 10, 110, 210 for any given set of operating conditions.

Although the heat exchanger assemblies 10, 110, 210 are shown and described throughout as including each of the liquid cooled condenser core, an air cooled condenser core, and a low temperature radiator core, it should be understood that each of the heat exchanger assemblies 10, 110, 210 may be adapted to include only a combination of a liquid coolant passed heat exchanger core and a single air passed heat exchanger core while remaining within the scope of the present invention, as the introduction of the liquid passed heat exchanger core will still reduce the necessary packaging space for any heat exchanger assembly utilizing a secondary air passed heat exchanger core in comparison to a dual air passed heat exchanger of similar construction.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An integrated heat exchanger assembly comprising:
   a first header tank;
   a second header tank;
   a first heat exchanger core extending between the first header tank and the second header tank, the first heat exchanger core in fluid communication with a liquid coolant and a refrigerant;
   a second heat exchanger core extending between the first header tank and the second header tank, the second heat exchanger core in fluid communication with a first portion of a flow of air and the refrigerant; and
   a third heat exchanger core extending between the first header tank and the second header tank, the third heat exchanger core in fluid communication with a second portion of the flow of the air and the liquid coolant.

2. The integrated heat exchanger assembly of claim 1, wherein the first heat exchanger core, the second heat exchanger core, and the third heat exchanger core are all disposed on a common plane arranged perpendicular to the direction of the flow of the air through the integrated heat exchanger assembly.

3. The integrated heat exchanger assembly of claim 1, wherein a housing is disposed between the first header tank and the second header tank, the housing delimiting a flow of the liquid coolant in fluid communication with the first heat exchanger core.

4. The integrated heat exchanger assembly of claim 3, wherein the housing includes coolant ports formed at opposite ends thereof for establishing a counter-flow relationship between the liquid coolant and the refrigerant within the housing.

5. The integrated heat exchanger assembly of claim 3, wherein the first heat exchanger core is formed by a plurality of first tubes extending between the first header tank and the second header tank, wherein the housing surrounds the plurality of the first tubes.

6. The integrated heat exchanger assembly of claim 1, wherein the integrated heat exchanger assembly is in fluid communication with a coolant circuit circulating the liquid coolant, the coolant circuit including at least one heat generating component disposed outside of the integrated heat exchanger assembly.

7. The integrated heat exchanger assembly of claim 6, wherein the liquid coolant encounters, in order, the at least one heat generating component, the first heat exchanger core, and the third heat exchanger core when flowing through the coolant circuit.

8. The integrated heat exchanger assembly of claim 6, wherein the liquid coolant encounters, in order, the at least one heat generating component, the third heat exchanger core, and the first heat exchanger core when flowing through the coolant circuit.

9. The integrated heat exchanger assembly of claim 6, wherein the liquid coolant is divided into a first partial flow and a second partial flow while circulating through the coolant circuit, wherein the first partial flow of the liquid coolant flows through the first heat exchanger core and the second partial flow of the liquid coolant flows through the at least one heat generating component.

10. The integrated heat exchanger assembly of claim 6, wherein the liquid coolant is divided into a first partial flow and a second partial flow while circulating through the coolant circuit, wherein the first partial flow of the liquid coolant flows through the first heat exchanger core and the second partial flow of the liquid coolant flows through the third heat exchanger core.

11. The integrated heat exchanger assembly of claim 1, wherein the first heat exchanger core is formed by a plurality of first tubes, the second heat exchanger core is formed by a plurality of second tubes, and the third heat exchanger core is formed by a plurality of third tubes.

12. The integrated heat exchanger assembly of claim 11, wherein the first header tank is divided into a first refrigerant chamber and a first coolant chamber and the second header tank is divided into a second refrigerant chamber, a third refrigerant chamber, and a second coolant chamber, wherein the plurality of the first tubes extends between the first refrigerant chamber and the second refrigerant chamber, wherein the plurality of the second tubes extends between the first refrigerant chamber and each of the second refrigerant chamber and the third refrigerant chamber, and wherein the plurality of the third tubes extends between the first coolant chamber and the second coolant chamber.

13. The integrated heat exchanger assembly of claim 1, wherein the first heat exchanger core forms a condenser of a refrigerant circuit for cooling the refrigerant, the second heat exchanger core forms a condenser of the refrigerant circuit for cooling the refrigerant, and the third heat exchanger core forms a radiator of a coolant circuit for cooling the liquid coolant.

14. An integrated heat exchanger assembly comprising:
a first header tank;
a second header tank spaced apart from the first header tank;
a first heat exchanger core including a plurality of first tubes extending between the first header tank and the second header tank, each of the first tubes in fluid communication with a liquid coolant and a refrigerant;
a second heat exchanger core including a plurality of second tubes extending between the first header tank and the second header tank, each of the second tubes in fluid communication with a flow of air and one of the liquid coolant or the refrigerant; and
a housing extending between the first header tank and the second header tank, the housing surrounding the first tubes and delimiting a flow of the liquid coolant in fluid communication with each of the first tubes.

15. The integrated heat exchanger assembly of claim 14, wherein the housing includes coolant ports formed at opposite ends thereof for establishing a counter-flow relationship between the liquid coolant and the refrigerant within the housing.

16. The integrated heat exchanger assembly of claim 14, wherein the housing is tubular and open at each end thereof.

17. The integrated heat exchanger assembly of claim 14, wherein a first collar structure projects from the first header tank and an open end of the housing is received within the first collar structure.

18. The integrated heat exchanger assembly of claim 14, wherein the first collar structure surrounds a plurality of tube openings formed in the first header tank for receiving the plurality of the first tubes.

19. The integrated heat exchanger assembly of claim 14, wherein the housing is formed by a pair of cooperating shells.

20. The integrated heat exchanger assembly of claim 14, wherein the first heat exchanger core forms a condenser of a refrigerant circuit circulating the refrigerant, and wherein the second heat exchanger core forms one of a condenser of the refrigerant circuit or a radiator of a coolant circuit circulating the liquid coolant.

* * * * *